March 9, 1943.  F. X. LAMB  2,313,445
PRECISION GEARING
Filed Oct. 23, 1941
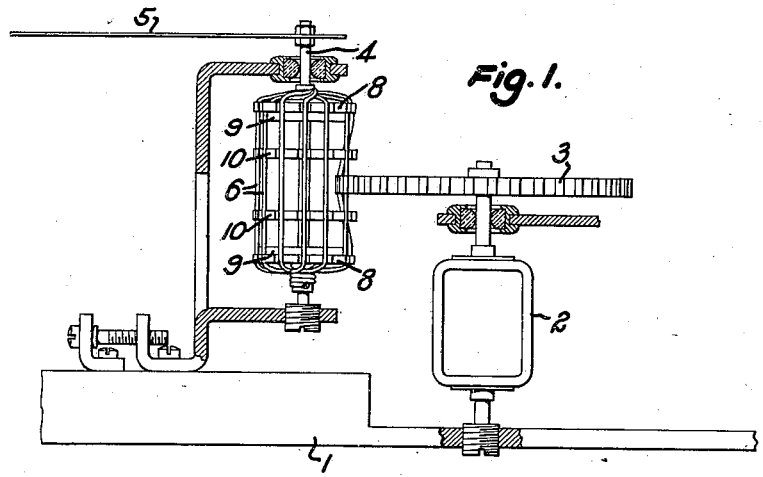
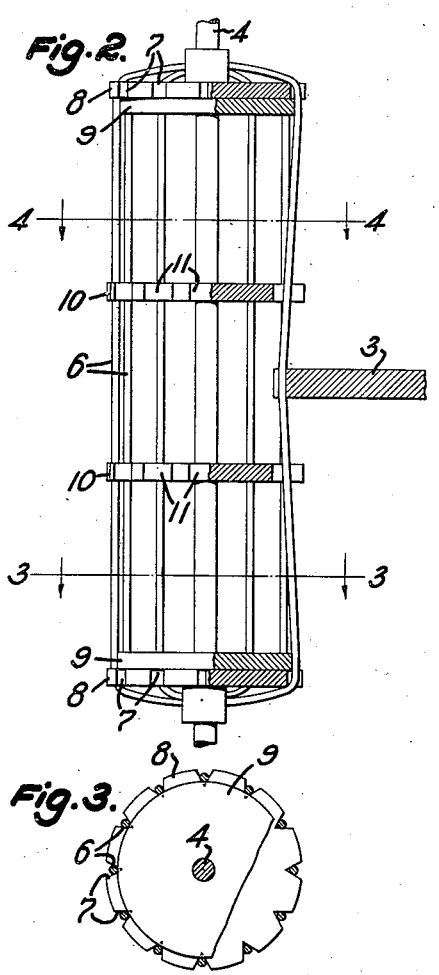
Inventor:
Francis X. Lamb,
By Pierce & Scheffler
Attorneys.

Patented Mar. 9, 1943

2,313,445

UNITED STATES PATENT OFFICE 2,313,445

PRECISION GEARING

Francis X. Lamb, East Orange, N. J., assignor to Weston Electrical Instrument Corporation, Newark, N. J., a corporation of New Jersey Application October 23, 1941, Serial No. 416,276

9 Claims. (Cl. 74—461)

This invention relates to precision gearing, and particularly to filar gears that may engage a rigid driver gear without clearance or backlash.

In my copending application Serial No. 416,275 filed October 23, 1941, "Precision gearing," I have described novel filar gears that impose substantially no load upon a prime mover of minute power output, such as a sensitive measuring instrument, and the present invention relates to improvements in such filar gear elements.

An object of the present invention is to provide filar gears in which the filamentary tooth elements are accurately located with respect to each other and to the gear axis. An object is to provide filar gears including notched or skeleton safety flanges that limit the circumferential displacement of the filamentary tooth elements and thus prevent a jump or slip of the filar gear with respect to its driver gear. More specifically, an object is to provide a filar driven gear including notched flanges upon which a resilient filament is wound to form the tooth elements of the gear, and one or more accurately dimensioned disks are located adjacent said notched flanges to determine the normal pitch diameter of the filar gear.

These and other objects and advantages of the invention will be apparent from the following specification when taken with the accompanying drawing in which:

Fig. 1 is an enlarged and somewhat schematic side elevation, with parts in section, of a measuring instrument that includes a motion-multiplying gearing embodying the invention;

Fig. 2 is a side elevation of a filar gear embodying the invention, with a number of the filar tooth elements removed for clearness and with parts in section;

Figs. 3 and 4 are transverse sections on lines 3—3 and 4—4, respectively, of Fig. 2;

Fig. 5 is a transverse sectional view of another type of safety member; and

Fig. 6 is a fragmentary vertical section through an end of another form of filar gear embodying the invention.

In Fig. 1 of the drawing, the reference numeral 1 identifies the base or sub-base of an electrical measuring instrument having a moving system 2 that carries a rigid gear 3 for rotating a filar gear on the staff 4 that carries a pointer 5. The filar tooth elements 6 are seated in notches 7 in the edges of flanges 8 that are secured to or integral with the staff 4.

The diameters of the filaments 6 and the flanges 8 have been exaggerated in Fig. 1 for clearness of illustration. As described in my copending application, the filar tooth elements may be resilient threads of silk or of synthetic plastic such as "Nylon," natural or synthetic bristles, wires, or strands of other resilient materials capable of slight transverse bending when engaged by the rigid driver gear. The invention is not limited to any particular dimensions and the following data with respect to one satisfactory embodiment is given only as an example of appropriate design. A filar gear for multiplying the displacement of the pivoted coil of a sensitive measuring instrument comprised tooth elements of Nylon thread of a diameter of 0.0017 inch and a length of 0.60 inch on a pitch diameter of about 0.15 inch.

When the filar gear is of small diameter, as is usually the case, it is difficult to cut the notches 7 in the two flanges 8 so that all filaments 6 will lie on exactly the same outside diameter. Variations in the depths and the angle of the notches affect the pitch diameter of the filar tooth elements, and some of the filaments may press too tightly against the rigid gear 3 while others may not seat to the root of the rigid gear teeth, thus resulting in free play or backlash. These variations in pitch diameter are eliminated by attaching solid disks 9 to the staff 4 and against the inner surfaces of the gear flanges 8. The disks 9 are easily machined to provide cylindrical surfaces coaxial with the staff 4 and of substantially exact dimensions. The disks 9 have a diameter somewhat greater than that of the roots of the notches 7 that determine the angular spacing of the filaments. The filaments seat against the disks 9 and are thus accurately positioned with respect to the axis of the staff.

A safety flange, or a pair of safety flanges 10, is secured to the staff 4 adjacent the driver gear 3 to prevent a slippage of the gearing in the case of suddenly applied forces. The filar tooth elements extend through the wide notches at the edge of the safety flange and normally are not engaged by the teeth or spider arms 11 that lie between the notches. The teeth or arms 11 limit the lateral movement of the filaments 6 when a strong force is applied to the filar gear, thus preventing possible jumping or slipping of the gear teeth. The safety member may be constructed as a rimless wheel, see Fig. 5, comprising a collar or hub 10' into which wire spokes 11' are inserted.

Another construction of the member for accurately locating the filaments with respect to the staff axis is shown in Fig. 6. The flared spacing member 12 was initially formed as an integral tubular sleeve on the gear flange 8', and the sleeve was then outwardly spun and accurately machined to the desired diameter.

It is to be understood that the invention is applicable to filar gears of the type in which separate filaments are used in place of the illustrated continuous winding of a long thread in notches of the end flanges 8, and that the filar gear may be used with small power output devices other than the measuring instrument that is shown in Fig. 4. Various changes that may be made in the parts, their relative size, shape and relationship fall within the spirit of my invention as set forth in the following claims.

I claim:

1. A filar gear comprising a staff, axially spaced flanges on said staff, resilient filaments extending between said flanges and constituting the tooth elements of said gear, said flanges including means spacing said filaments circumferentially from each other, and means adjacent one of said flanges spacing said filaments radially from said staff, said radial spacing means comprising a member having a filament-engaging surface coaxial with said staff.

2. A filar gear as claimed in claim 1, wherein said member comprises a disk having an outer circumferential surface for engagement with said filaments.

3. A filar gear as claimed in claim 1, wherein said member comprises an outwardly flared sleeve integral with one of said flanges.

4. A filar gear comprising a staff carrying axially spaced flanges, resilient filaments extending between and secured to said flanges to constitute the tooth elements of the filar gear, and means carried by said staff to limit the lateral flexing of said resilient filaments, said means including a central portion secured to the staff and radially projecting portions extending between adjacent filaments and spaced circumferentially from said filaments in their normal non-flexed condition.

5. A filar gear as claimed in claim 4, wherein said means comprises a circumferentially notched disk.

6. A filar gear as claimed in claim 4, wherein the central portion of said means comprises a hub, and said radially projecting portions are spokes fixed to the hub.

7. A filar gear comprising a staff carrying axially spaced flanges, resilient filaments extending between and secured to said flanges, said filaments being circumferentially spaced and forming the tooth elements of the gear, and a safety member on and secured to said staff adjacent the mid-portions of said filaments to limit the lateral flexing of the filaments, said safety member having circumferentially wide notches through which the respective filaments extend.

8. A filar gear comprising a staff carrying a pair of axially spaced flanges, the circumferential edges of said flanges being provided with axially alined notches, a resilient strand wound in said notches to form the tooth elements of the gear, disks at the inner sides of the respective flanges and coaxial with said staff, the outer surfaces of said disks being engaged by said filar tooth elements to determine the normal pitch diameter of the gear.

9. A filar gear as claimed in claim 8, in combination with a safety member on said staff adjacent the mid-portions of said tooth elements to limit the lateral flexing thereof, said safety member having wide circumferential notches through which the respective tooth elements extend.

FRANCIS X. LAMB.